April 18, 1961 C. F. CARLZEN ET AL 2,979,726

ELECTRONIC COMPONENT ASSEMBLY APPARATUS

Filed May 1, 1956 8 Sheets-Sheet 1

INVENTORS
CARL F. CARLZEN
WILLIAM L. LEHNER
BY
Norman J. O'Malley
ATTORNEY

April 18, 1961 C. F. CARLZEN ET AL 2,979,726

ELECTRONIC COMPONENT ASSEMBLY APPARATUS

Filed May 1, 1956 8 Sheets-Sheet 2

INVENTORS
CARL F. CARLZEN
WILLIAM L. LEHNER
BY Norman J. O'Malley

April 18, 1961 C. F. CARLZEN ET AL 2,979,726

ELECTRONIC COMPONENT ASSEMBLY APPARATUS

Filed May 1, 1956 8 Sheets-Sheet 3

INVENTORS
CARL F. CARLZEN
WILLIAM L. LEHNER
BY
Norman J. O'Malley

INVENTORS
CARL F. CARLZEN
WILLIAM L. LEHNER
BY
Norman J. O'Malley

ELECTRONIC COMPONENT ASSEMBLY APPARATUS

Filed May 1, 1956

8 Sheets-Sheet 5

INVENTORS
CARL F. CARLZEN
WILLIAM L. LEHNER
BY Norman J. O'Malley
ATTORNEY

INVENTORS
CARL F. CARLZEN
WILLIAM L. LEHNER
BY
Norman J. O'Malley
ATTORNEY

INVENTORS
CARL F. CARLZEN
WILLIAM L. LEHNER
BY Norman J. O'Malley
ATTORNEY

April 18, 1961 C. F. CARLZEN ET AL 2,979,726

ELECTRONIC COMPONENT ASSEMBLY APPARATUS

Filed May 1, 1956 8 Sheets-Sheet 8

INVENTORS
CARL F. CARLZEN
WILLIAM L. LEHNER
BY Norman J. O'Malley
ATTORNEY

United States Patent Office 2,979,726 Patented Apr. 18, 1961

2,979,726

ELECTRONIC COMPONENT ASSEMBLY APPARATUS

Carl F. Carlzen, Buffalo, and William L. Lehner, Snyder, N.Y., assignors, by mesne assignments, to Sylvania Electric Products Inc., Wilmington, Del., a corporation of Delaware Filed May 1, 1956, Ser. No. 581,907

5 Claims. (Cl. 1—323)

This invention relates to automatic assembly apparatus, and more particularly to apparatus for automatically positioning and securing in pre-determined relation, upon suitable insulating baseboards or panels, certain of the components employed in the manufacture of radio and television receivers or similar electrical and electronic devices, and the invention has for an object the provision of a simple, reliable and automatic apparatus of of this character.

The mechanization of factories and particularly the mechanization of production lines, which presently require the performance of numerous and precise manual operations, has recently become of increasing importance because of the necessity of reducing costs while maintaining an ever improving quality, and numerous proposals have been advanced and are being advanced in an endeavor to provide automatic machinery for mechanizing such production lines. This mechanization is particularly evident in the industry which is employed in the manufacture of electronic apparatus such as radio and television receivers in which a large number of components, i.e., resistors, condensers, tube sockets, transformers, and the like must be assembled on a base or panel and connected together in the desired circuit relationships.

In most radio and television receivers, the number of resistors and condensers employed usually constitutes a numerical majority of the desired components, and these resistors and condensers are usually in the form of an elongate body portion having lead wires extending axially from the ends of the body portion which are adapted to be electrically connected to appropriate conductors so as to complete the desired electrical circuits. Numerous problems arise in connection with the method of manipulating such components so as to insure a secure electrical connection of the leads to other circuit components and to insure correct positioning of these resistors and condensers so that they are supported in suitable positions and in suitable circuit relationships.

In view of improvements in printed circuit techniques, it has been found advantageous, where permitted by the circuitry, to suitably form the circuit conductors upon one side of an insulating baseboard or panel and to mount the various electrical components on the opposite side of the baseboard with appropriate connecting leads extending therefrom through the baseboard for electrical connections with the printed circuit.

It is a further object of the invention, therefore, to provide an apparatus for assembling any number of resistors, condensers, or other electrical components upon a suitable baseboard with the conducting leads of the components extending through the baseboard or baseboard connectors at desired locations so as to permit proper electrical connection of the components in the circuit, and to secure the components to the base.

Additional problems are encountered in fulfilling the requirement of providing a means for efficiently and accurately feeding the components to the panel upon which it will be mounted so as to insure positive component feed action and making certain that a component will be available for each operation of the machine even in those instances where the distance between successive components in the feed device is not uniform. Accordingly, a still further object of the invention is the provision of a component feed device which operates in accordance with the above described requirement.

The foregoing objects are achieved in one aspect of the invention by the provision of an apparatus having elements located at a work station where suitable baseboards are received, either with or without a printed circuit formed thereon, and provided with means including a component feed device for conveying or transferring to the work station from a supply position, components such as resistors, or condensers having a body portion from which suitable lead conductors extend. The apparatus includes lead forming and component positioning or ejecting devices constructed to perform an operation wherein the component leads are bent at an acute angle relative to the longitudinal axis of the component and the bent portions are subsequently inserted into lead wire receiving portions or apertures provided in the baseboards or panels at the appropriate positions. A clinching device may be disposed on the opposite side of the panel at the work station for clinching the ends of the leads to secure the component to the panel.

Preferably, the feeding means for automatically supplying the components to the work station includes a guide track having spaced guide members, the walls of which are shaped to receive the components therebetween with the lead conductors extending laterally of the track. The discharge end of the track is exposed at the work station and means are provided for supplying to the opposite end of the guide track a component transfer device such as a strip of tape having a plurality of the desired components removably secured thereto in parallel laterally extending relationships. A transfer device receiving member is positioned to receive the tape after the components have been removed therefrom at the work station. This feeding device cooperates with the component handling device to effectively bring the leading one of a plurality of serially arrayed components into the work station after each assembly operation.

For a better understanding of the invention, reference is made to the following description taken in conjunction with the accompanying drawings in which:

Fig. 2(*a*) illustrates the general form of an electrical component of the type which is adapted to be used with the apparatus shown in Fig. 1;

Figure 1:
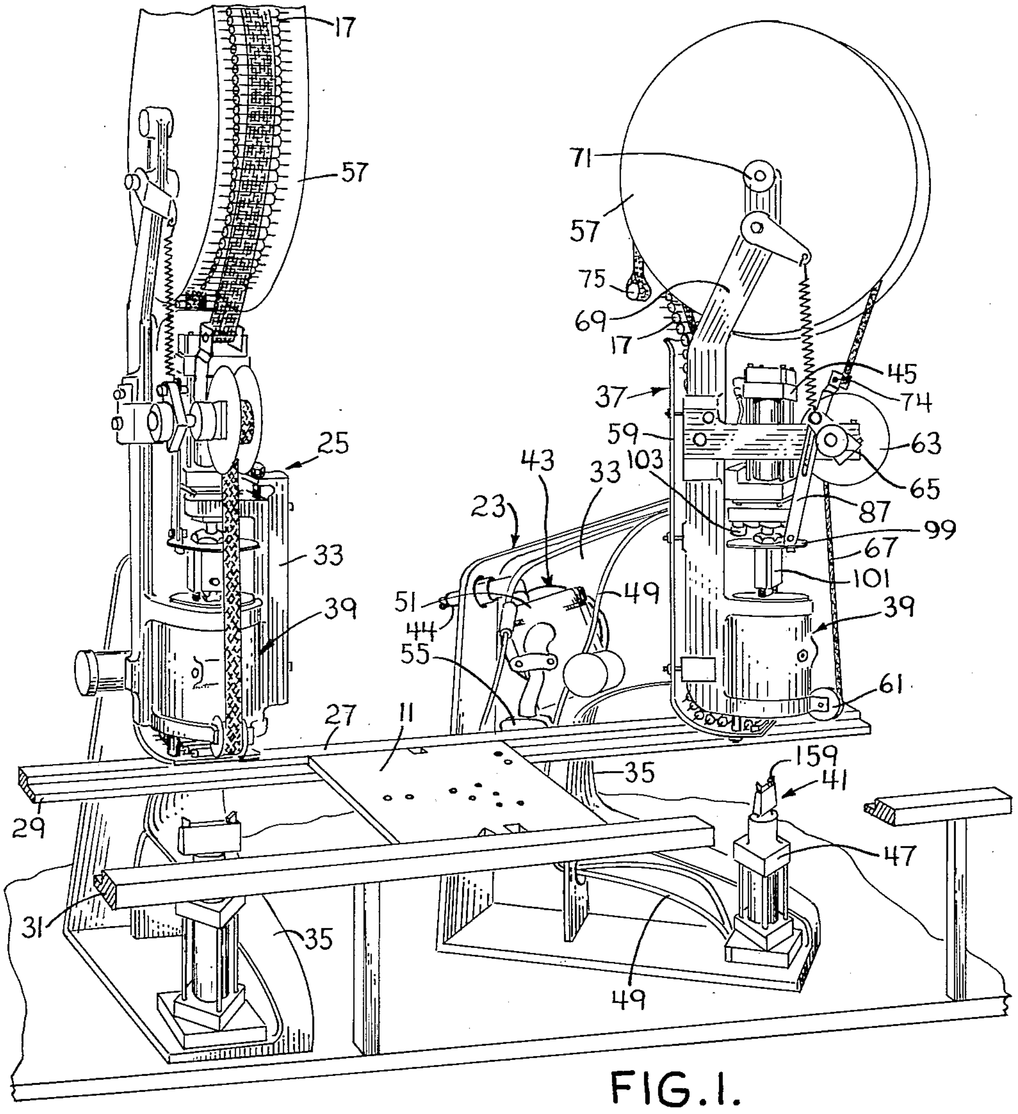
Fig. 1 is a perspective view of a portion of an automatic assembly line incorporating several component assembly machines embodying certain aspects of the invention.
Figure 6:
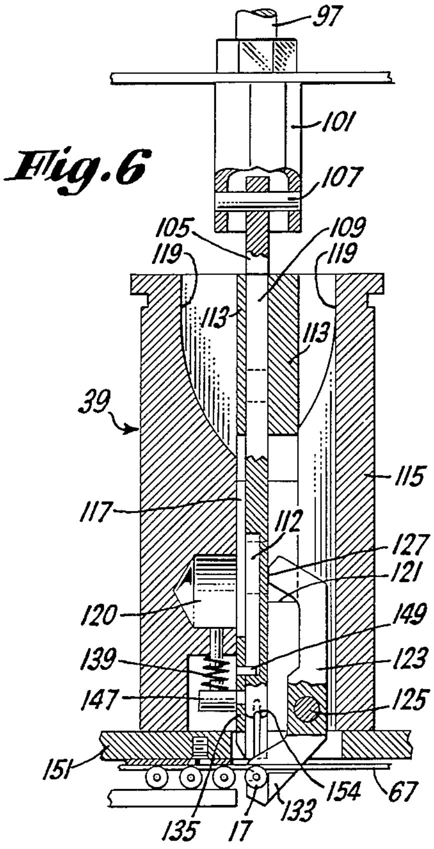
Fig. 6 is a section taken along line 6—6 of the view shown in Fig. 3.
Figure 7:
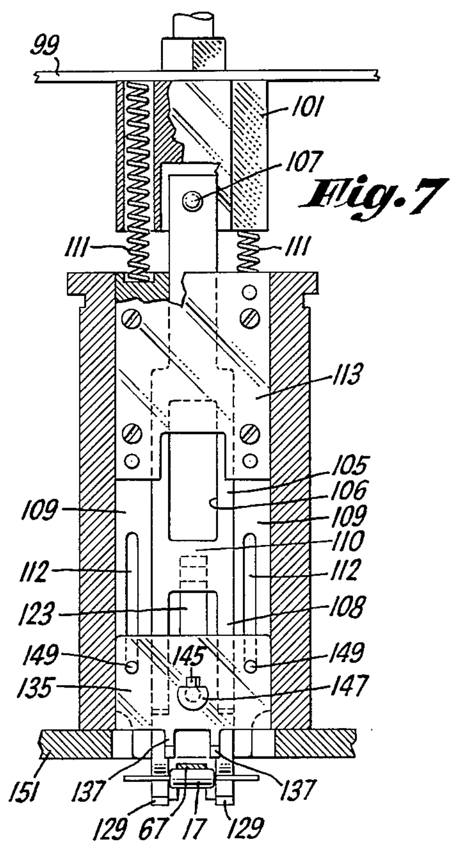
Fig. 7 is a section taken along line 7—7 of the view shown in Fig. 5.
Figure 14:
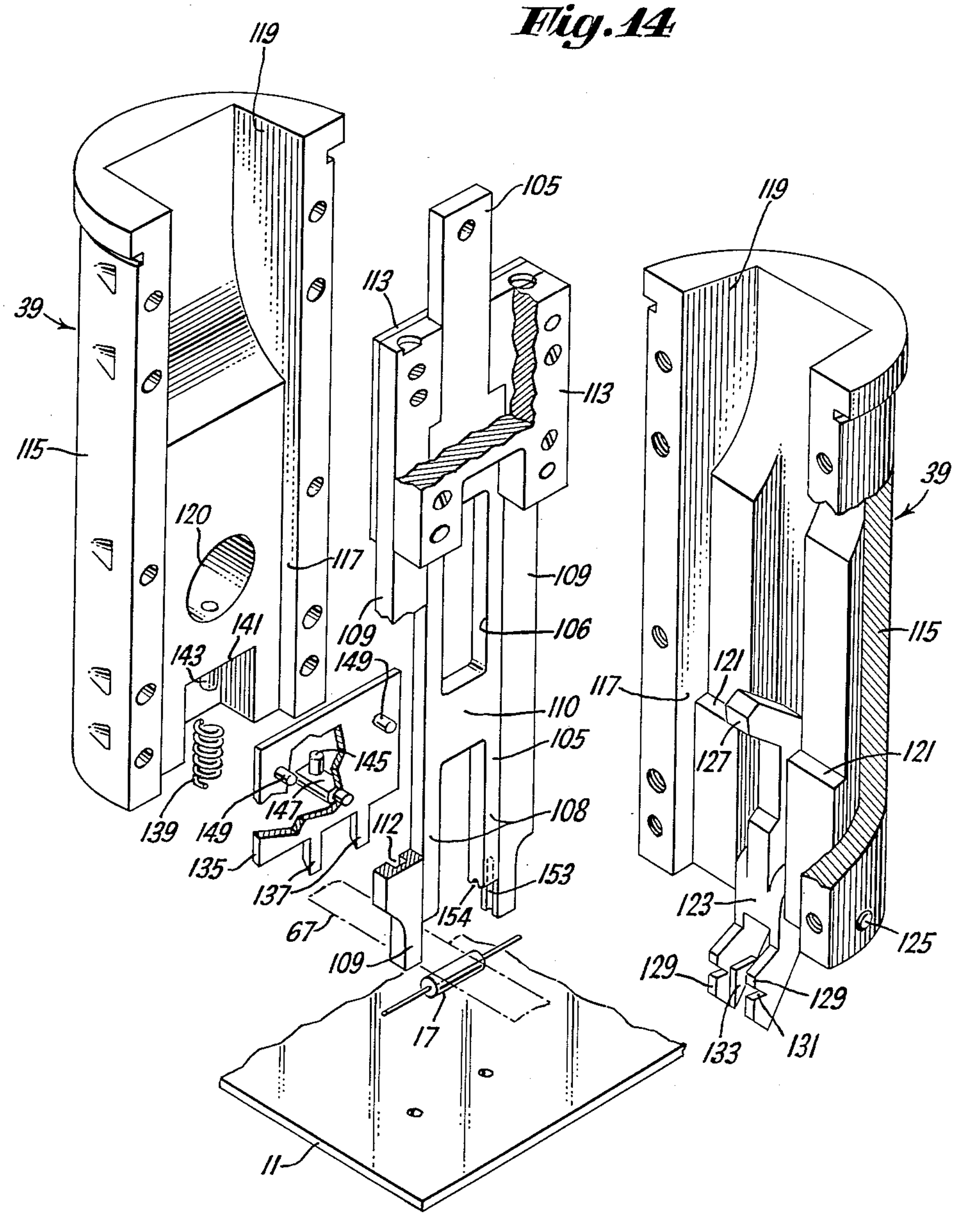

Figs. 8 through 13 inclusive are fregmentary sections similar to those shown in Figs. 6 and 7 illustrating the movements of certain of the parts embodied in the machines shown in Fig. 1; and Fig. 14 is an exploded perspective view of the machine components illustrated in Figs. 6 through 13.

Figure 2:
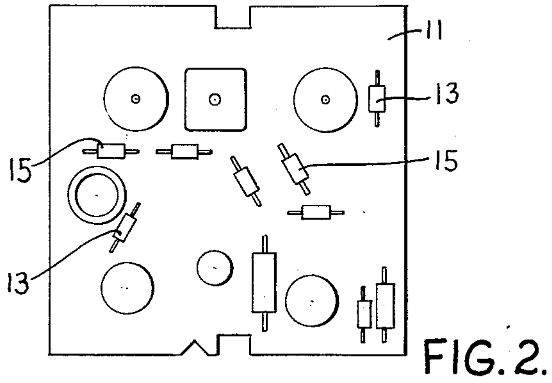
Fig. 2 is a typical chassis for a radio receiver or an audio section of a television receiver including a base member or panel upon which electrical components are positioned by an automatic mounting apparatus such as the one shown in Fig. 1.
Figure 2:
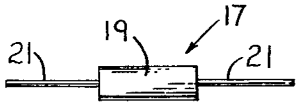

Referring first to Fig. 2, there is shown, solely for the purposes of illustration, a conventional, chassis for a radio receiver which comprises a suitable insulating baseboard or panel 11 upon which is mounted various electrical components including a plurality of resistors 13, a plurality of condensers 15, and the usual tubes, transformers, etc. The resistors 13 and condensers 15 are of the type which include an elongate body portion having axially extending lead conductors. A typical component 17 which may be either a condenser or a resistor, is shown in Fig. 2(*a*) as comprising a body portion 19 and axially extending conductor leads 21. Other types of components such as small tubes and crystal diodes may also have this type of configuration.

Figures 12, 13:
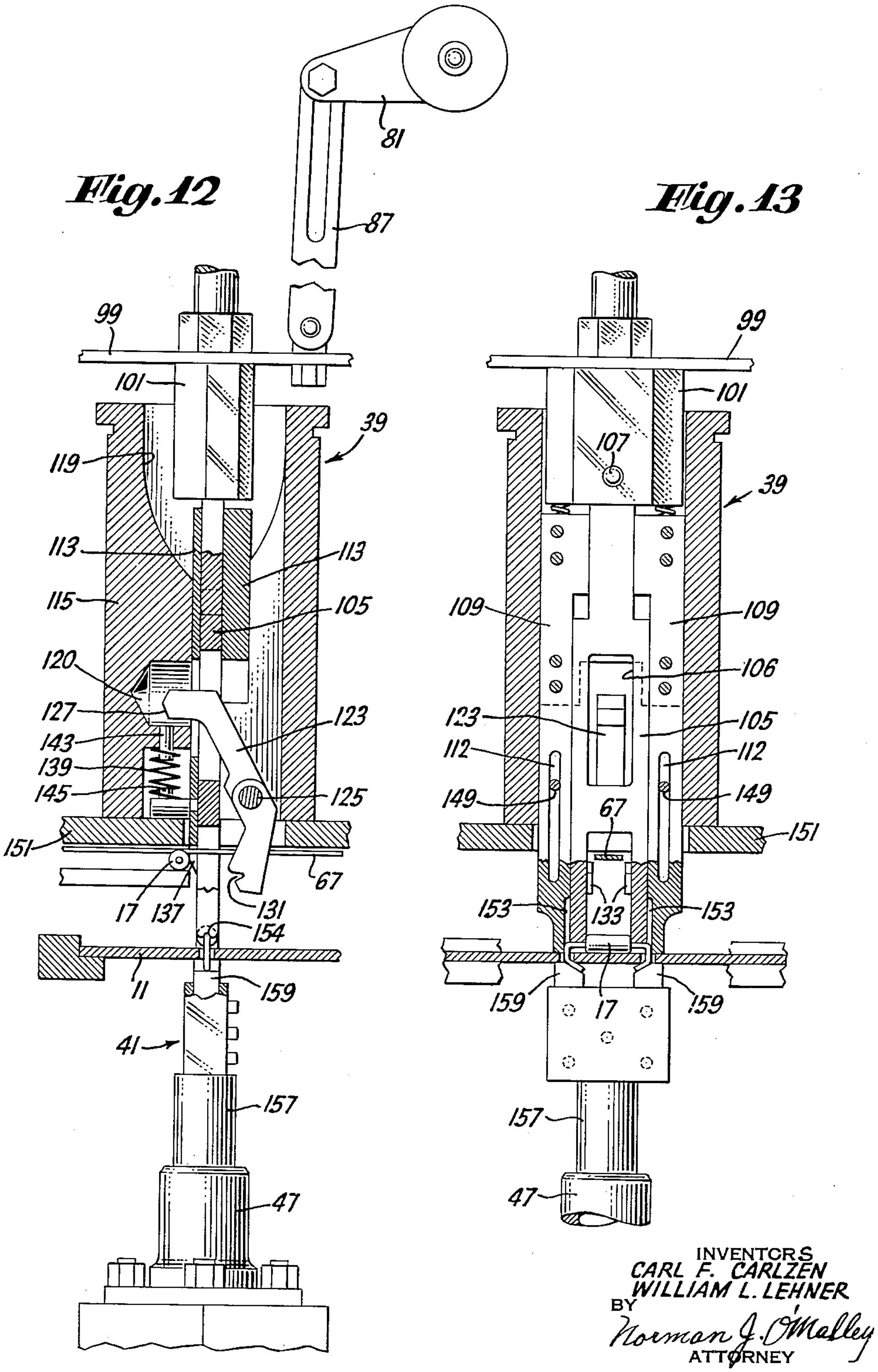

In accordance with one aspect of the invention, the resistors and condensers are positioned on panel 11 by first bending the end portions of the leads 21 at substantially right angles to the longitudinal axis of the component, inserting the leads through suitably positioned wire receiving apertures in panel 11, and finally clinching the extended ends of the leads so as to fasten the component to the baseboard as is clearly shown in Fig. 13. Subsequently, the desired circuit connections are completed by soldering the clinched ends of the leads as well as the extended ends of the appropriate leads from various other components either to properly positioned printed circuits (not shown) on the opposite side of panel 11 or to other suitable conductors. In accordance with one aspect of the invention, the lead forming, component inserting or ejecting, and lead clinching operations are accomplished automatically in a simple and reliable single operation.

Referring now to Fig. 1 of the drawings, an automatic capacitor assemblying apparatus 23 and an automatic resistor assemblying apparatus 25 is shown in association with a suitable conveyor 27 which functions to feed panel 11 to the apparatus 23 and 25. Conveyor 27 may be of the type described in copending application S.N. 454,964, filed September 9, 1954, now U.S. Patent 2,873,513, issued February 17, 1959, and assigned to the same assignee as this application. For the purpose of the present description, it is sufficient to state that the conveyor includes a pair of track members 29 and 31 for supporting the edges of the boards 11 and automatic means acting in conjunction with the assembly apparatus to effect step by step movement of the boards along the tracks so as sequentially to bring each board into proper position with respect to each assembly apparatus, stop it at this position until the assembly operation is complete and subsequently move it along the line to the following apparatus. Since the assembly apparatus 23, and 25 may be similar except for the size, shaping and proportions of some of the parts, only the assembly apparatus 23 will be described in detail.

Figure 5:
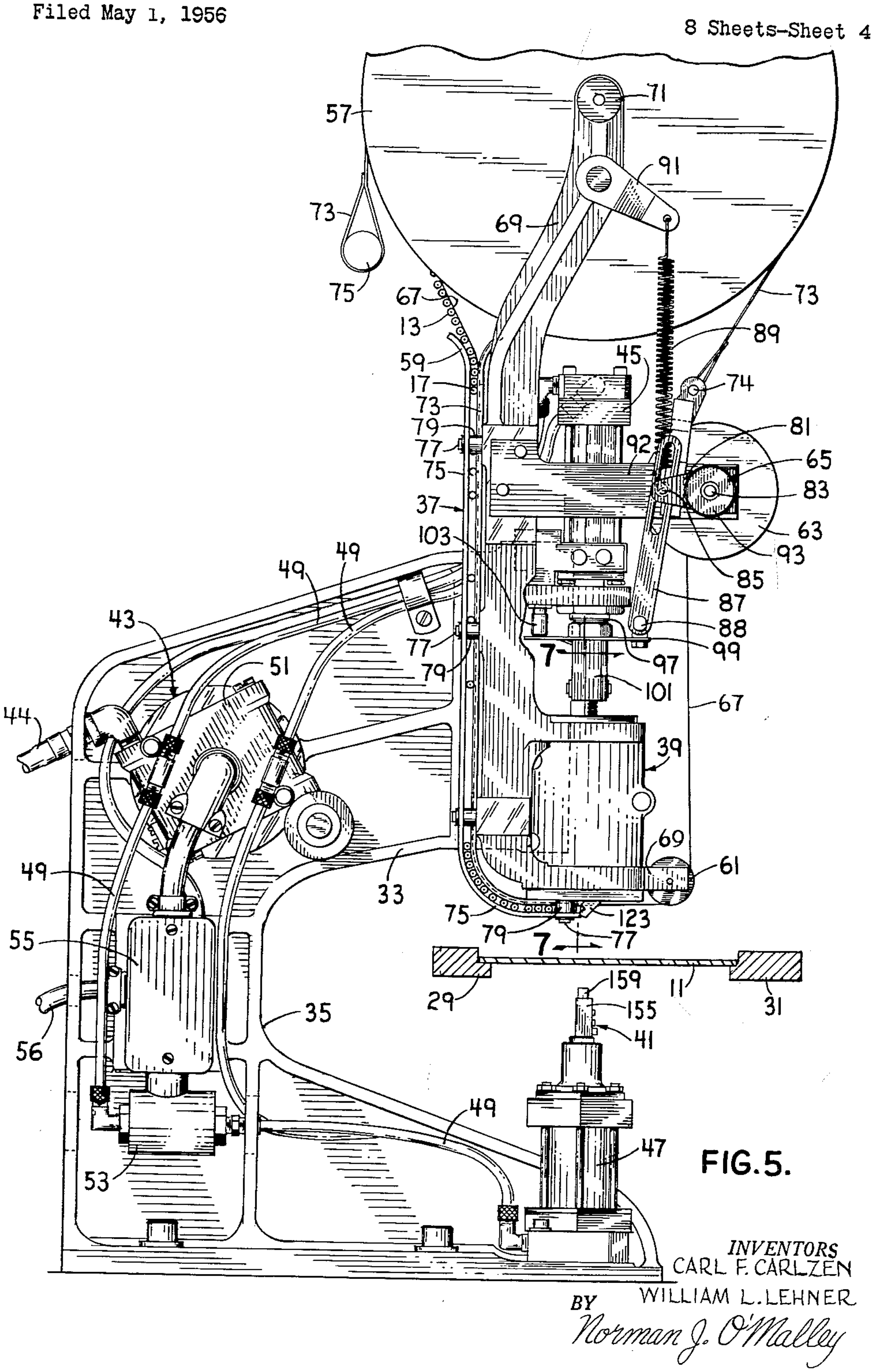
Fig. 5 is a side elevation view of one of the machines shown in Fig. 1.

As shown in Figs. 1 and 5 of the drawings, apparatus 23 has a main mounting plate or frame 33 upon which all of the operating, supporting and guiding elements are mounted. The frame 33 has a recess 35 formed to permit the track members 29 and 31 to pass therethrough intermediate the upper and lower portions of the mounting frame. By reason of this arrangement it will be apparent that the apparatus 23 and 25 may be adjusted longitudinally, angularly, or laterally to permit assembly at any desired position on panel 11. Furthermore, if desired, additional units similar to assembly apparratus 23 and 25 may be positioned on either or both sides of the track members so as to conserve space and permit the simultaneous insertion of a plurality of components into a single board.

Mounted on frame 33 of assembly apparatus 23 are a component feed device 37, a component handling device 39 formed to provide lead forming and component ejecting operations, a lead clinching member 41, and power means for inaugurating and providing the sequential movements for these devices.

The power means for operating the transfer mechanism and the various component assembly mechanisms along the assembly line may comprise a pneumatic pressure system which supplies a chamber such as the one indicated by the numeral 43 on apparatus 23 through conduit 44. This power is in turn imparted to reciprocating pneumatic motors 45 and 47, which may be of a type well known in the art and which serve to operate the reciprocating component handling members to be hereinafter described. It is not believed necessary to describe the motors in detail further than to point out that they are provided with suitable air supply conduits 49 and with suitable valves 51 and 53 for controlling the air supply, which valves may be operated either electrically, as by an electrical control unit 55, or mechanically. It will be understood that the present invention is not limited to the use of reciprocating air motors, but that any suitable power element may be employed.

In the embodiment of the invention shown and described herein, the pressure valves are electrically connected through cable 56 to the conveyor 27 so that electrical signals may be applied to the valves 51 and 53 at the proper time through control unit 55 to cause the movements of the reciprocating air motors 45 and 47 to be thereby affected. Sequentially, after the conveyor has indexed a panel into position, an electrical control signal provided by a timing mechanism (not shown) serving the entire assembly line of machines and the transfer mechanism causes valve 51 to supply pressure through conduits 49 to air motor 45 and to valve 53. The operation of air motor 45 and its associated apparatus causes the component leads to be bent and inserted into panel 11. After the leads are extended through the panel, another electrical signal from control unit 55 causes valve 53, already supplied with pressure from valve 51, to operate air motor 47 and its associated apparatus to cause the component leads to be clinched under panel 11 in a manner to be hereinafter described.

A subsequent electrical signal causes valve 51 to operate through conduits 49 to reverse the pressure applied to air motors 45 and 47, and to return them to their retracted positions. The conveyor then indexes the panels to their subsequent position.

The electrical components are fed to the assembly position by the component feed device 37 which comprises a supply drum 57, a guide track 59, a tape guide roll 61, a tape receiving member or take-up roll 63, and a tape feed actuating member 65.

Electrical components 17 are mounted in a parallel spaced relationship upon a strip of flexible or pliable adhesive tape 67. An adhesive is used having sufficient strength to maintain the components in the desired positions, while allowing them to be readily stripped from the tape at the work stations. The tape mounted components 17 are packaged in the form of a roll wound upon a drum of the type illustrated as supply drum 57. As shown in Figs. 1 and 5, supply drum 57 is mounted upon frame 33 by means of bracket 69 and its associated hub 71. The tape is maintained in a tight roll on the drum by means of the abutting relationship between the peripheral portions of the roll and a strap 73 held at one end by pin 74 and under tension by the weight 75 attached to the opposite end of the strap.

As shown in Fig. 5, guide track 59 is supported upon bracket 69 in a substantially vertical position to receive the tape carried components from the supply position at drum 57 and to guide the components to the work station where the component 17 is stripped or removed from tape 67 and mounted on panel 11. The track comprises a substantially L-shaped assembly of opposed guide surfaces 73 and 75, which are properly spaced from one another by bolts 77 and spacer sleeves 79. Guide surface 73 may be formed with a depression having a lateral dimension conforming substantially either to the width of tape 67 or the body of one of the components 17 to assist component tracking.

The tape feeding from supply drum 57 travels through guide track 59, over tape guide roll 61, and onto tape receiving member 63. Guide roll 61 is mounted on bracket 69 adjacent the component assembly position so that tape 67 will be drawn past the assembly position and upwardly to tape take-up roll 63.

Figure 3:
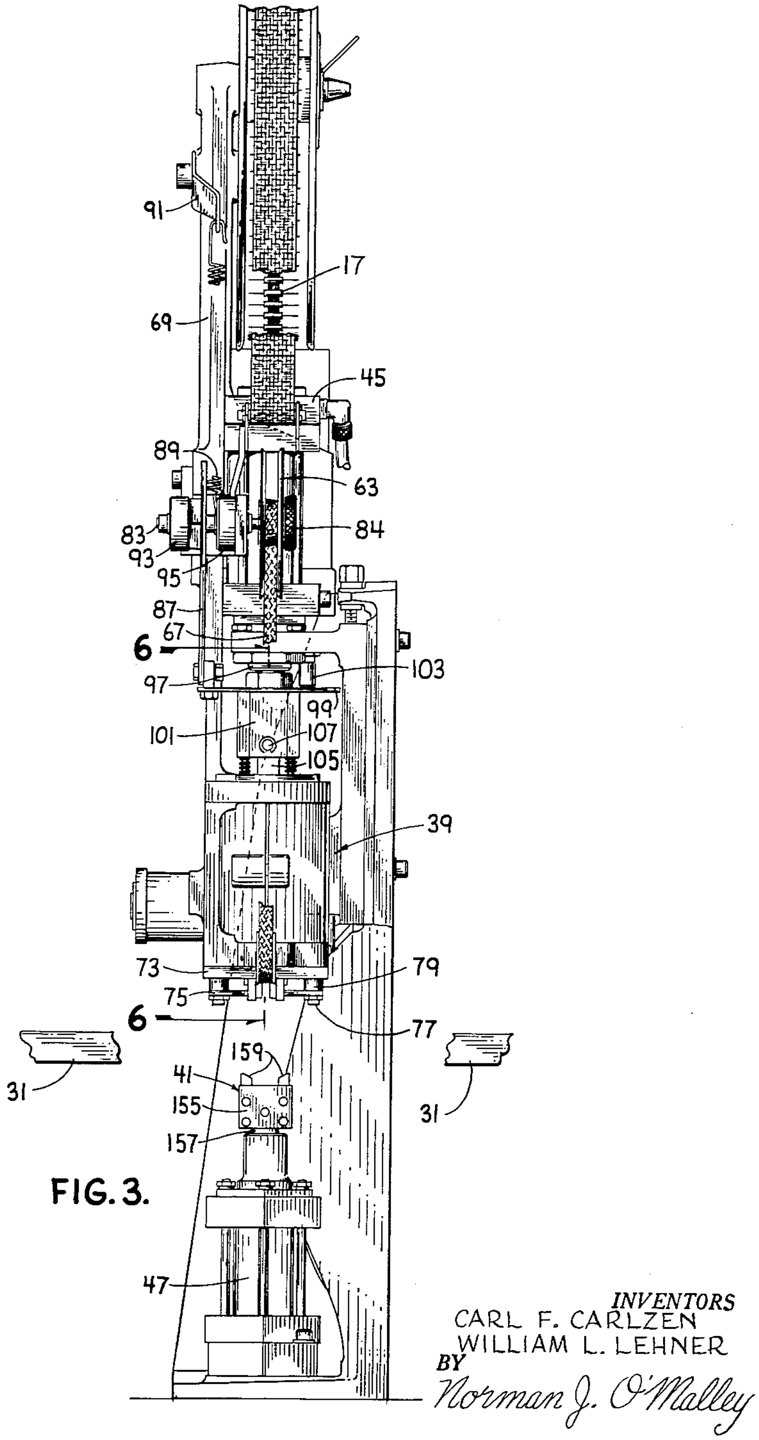
Fig. 3 is a front elevation view of one of the automatic assembly apparatus shown in Fig. 1.
Figure 4:
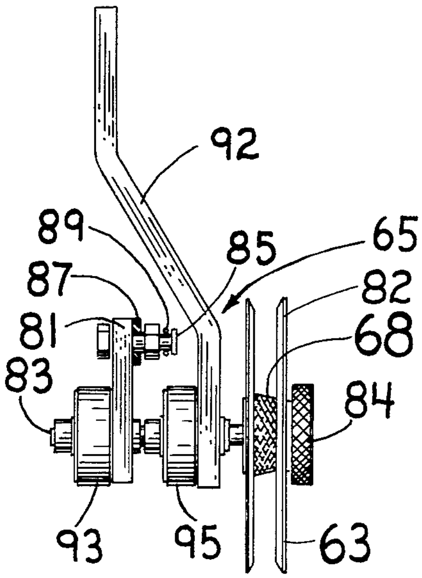
Fig. 4 is a top view of the component feed actuating mechanism employed with the apparatus.

Referring to Figs. 3, 4, and 5, tape movement feed actuator 65, which is mounted upon bracket 69, operates on receiving roll 63 to provide the means for tensioning tape 67 and for feeding the electrical components 17 to the work station. Actuator 65 comprises a lever 81 mounted upon shaft 83 for rotational movement, the end of the lever being provided with a pin 85 which is slidably confined within a slot formed in linkage 87. The end of the linkage opposite the slot is pivotally attached to the reciprocating assembly comprising a portion of the forming and ejecting member 39. Referring to Fig. 5, as air motor 45 causes certain parts of the member 39, which will be hereinafter described, to move vertically downward, linkage 87, which is attached to these parts by stud 88, provides counter-clockwise movement for lever 81 by means of the engagement between the upper end of the slot and pin 85. Spring 89, which is attached at one end to pin 85 and at the other end to bracket 69 by means of brace 91 provides the upward movement for the lever as member 39 subsequently reciprocates to its up position after the electrical component has been mounted upon panel 11. If desired, the power providing the movement for linkage 87 may be derived from a means other than a portion of member 39. For instance, a component holding device to be hereinafter described, could serve as a part of a meter for electrically testing the components as they are moved into the work station. The separate power means could then be made to operate more than once between machine assembly operations provided some of the components fail to pass the test and are ejected from the tape.

The movement of lever 81 is imparted to shaft 83 by two clutches 93 and 95. These clutches hold shaft 83 so that it will turn only in the direction of tape pull from tape roll 61, or otherwise stated, in a clockwise direction around tape take-up roll 63 as seen in Fig. 5. Clutch 93 will slip on shaft 83 on the downward movement of lever 81, and will engage the shaft and cause it to rotate on the upward movement of the lever. Brace 92 is affixed to bracket 69 on one end and supports clutch 95 on the other end so that the clutch will be allowed to turn in a clockwise direction only. Shaft 83, whose movement is thereby controlled by clutches 93 and 95, holds tape 67 under tension during the downward movement of lever 81, and rotates to wind the tape during the upward movement of the lever. The elongated slot in linkage 87 allows the lever to move through wide limits of travel. Therefore, if one or more components 17 are missing from their positions on tape 67, the movement of lever 81 in the upward direction will traverse a distance sufficient to bring the next component into the assembly position. In this manner, lever 81 and its cooperating linkage 87 and spring 89 serve to assure the successive presentation of the leading one of the components to the work station for each assembly operation whether or not some of the components are missing from the tape.

Tape receiving member 63 has a removable side plate 82, which is affixed to the opposite side plate and to center shaft 68, by means of knob 84. Removal of plate 82 affords an easy placement of tape 67 initially on member 63 and removal of the roll of tape after the receiving member has been filled.

The component handling or lead forming and ejecting member 39 derives its movement from air motor 45 and it is connected thereto by a plunger or rod 97, which is in turn connected to a horizontally disposed plate 99 and a block 101. This motor 45, rod 97 and block 101 serve as a portion of the power means providing the movement for member 39. A sensing device or limit switch 103 is mounted upon bracket 69 so as to engage plate 99 when the reciprocating parts of member 39 are in the rest or retarded position. A switch similar to the one shown in the drawings is mounted upon each machine on the assembly line to provide an electrical series circuit which will be completed when all of the machines in the assembly line are in this position. This series circuit is electrically connected to the electrical master control unit for the assembly line so that none of the machines or the transfer mechanism can start a new sequence until after all machines have returned to a rest position and each switch is operated.

Referring to Figs. 6 through 13, component handling or lead forming and component ejecting member 39 has a reciprocatable ejecting member 105 which is connected to block 101 by means of pin 107. Slidingly carried by ejecting member 105 for operation therewith during the initial portion of the operating cycle is a component lead forming member 109 having a vertical slot therein which slides along the edges of ejecting member 105. Two elongated recesses 112 are provided in the forming member on either side of the slot. Ejecting member 105 is formed with an aperture 106 which is separated from a terminal bi-furcated portion 108 by a cam surface 110. In order to provide movement for the lead forming member 109, the top surface of this member has recesses which provide a seat for compression springs 111. These springs extend through block 101 and rest against plate 99. The strength of springs 111 is such that during an initial portion of the downward stroke of the ejecting member 105, the forming member 109 will be driven with the ejector by the springs 111 until the forming member encounters a suitable stop to be hereinafter described. The ejecting member 105 will thereafter continue to travel downwardly independently of the forming member 109 and springs 111 will be compressed. In order to provide a guide path for the movement of ejecting member 105, it is confined within side plates 113 of forming member 109, and the internal surfaces of the vertical slot walls of the forming member. The downward movement of the ejecting member 105 is limited in travel to that position where the bottom surface of block 101 is approximately in contact with the top surface of plates 113. The lower portions of ejecting member 105 and forming member 109 have a width substantially equal to or less than the width of the component upon which it operates so that it can position a component on an area of the board which is surrounded by other previously mounted electrical components.

Figure 10:
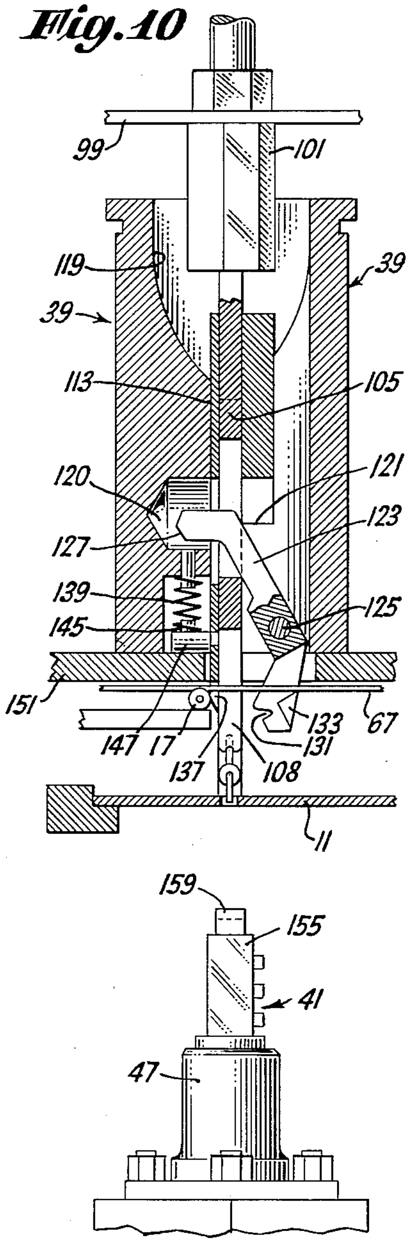
Figure 11:
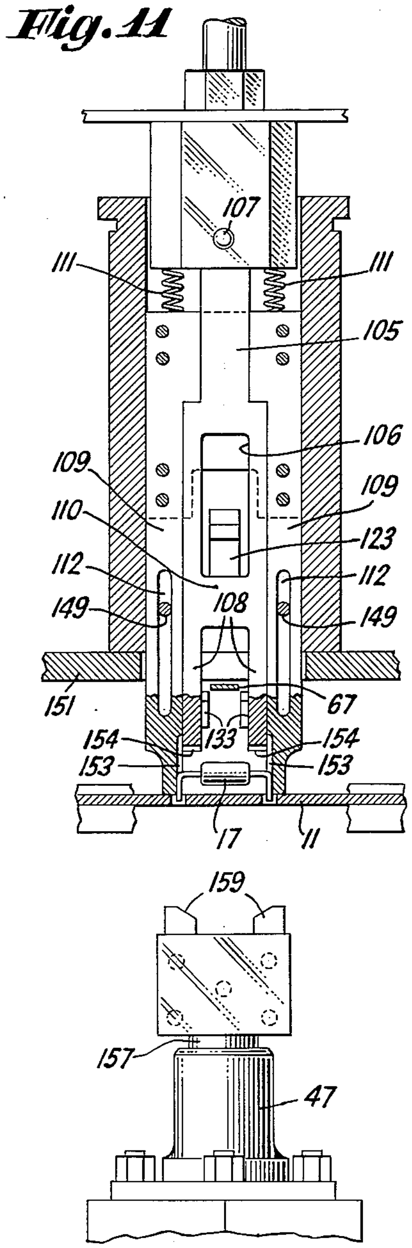

Component forming and ejecting device 39 is mounted upon bracket 69 by means of the cylindrical housing 115 which is provided with a centrally disposed and vertically extending slot 117 wherein the ejecting member 105 and forming member 109 reciprocate. The housing has a cavity 119 formed in the upper body portion so that block 101 may travel below the upper surface of the housing during its downward movement. Housing 115 is also provided with shelves 121 which are formed to contact the lower surface of side plates 113 and to thereby limit the downward travel of forming member 109 as shown in Figs. 10 and 11. An aperture 120 is formed in the lower part of the housing to allow movement therein of one portion of a component holding arm 123 in a manner to be hereinafter described.

The component holding arm 123 is pivotally attached to housing 115 by pin 125 so that the ends of the arm can rotate through a small angle. The upper end of arm 123 is formed to laterally extend from the central portion of the arm and its provided with a cam surface 127. The lower end of arm 123 has a pair of spaced fingers 129 formed with circular recesses 131 for cooperation with the axially extending leads of component 17. Intermediate the fingers 129 and rearwardly disposed from recesses 131 are component stop blocks 133 laterally spaced apart to allow the travel of tape 67 therebetween when the fingers 129 are in the position where they are engaging the component leads.

Component holding arm 123 operates to correctly position the tape fed component and to hold it during the period of opeartion wherein the axially disposed component leads are bent substantially vertically downward. Acting in conjunction with arm 123 is a stop plate 135 formed to provide spaced wedge-shaped stop fingers 137 which operate to assure separation of the component to be inserted into the panel 11 from the next succeeding component, and to provide additional means for cooperation with holding arm 123 to maintain the component in its correct positon while it is being handled. The downward movement of stop plate 135 is supplied by spring 139, which is confined within a cut-out portion 141 formed in housing 115 and held in alignment by pins 143 and 145. Associated with pin 145 is a lug 147 which is moved between an upper position when the forming and ejecting member 39 is retracted to a lowered position when member 39 is extended. The upward movement of stop plate 135 is provided by means of the cooperation between lug attached pins 149 and the bottom of elongated recess 112. The downward movement of plate 135 is restricted to that position where lug 147 seats upon the base plate 151 of housing 115.

As air motor 45 begins to drive ejecting member 105 and forming member 109 downwardly, cam surface 110 of the ejecting member is in contact with cam surface 127 of component holding arm 123 and recesses 131 are in engagement with the lead wires of the tape fed component 17. Acting in concurrence with the movement of members 105 and 109 is the downward movement of stop plate 135, which is allowed to move under the influence of spring 139 as pins 149 cease to be restricted by the bottom surface of elongated recesses 112. This movement of stop plate 135 places stop fingers 137 on the opposite side of the component from the recesses 131 formed in holding arm 123 and intermediate the component at the work station and the next preceding component. The action of holding arm 123 and stop plate 135 thereby assures proper support and positioning of the component during the lead forming operation.

Referring particularly to Figs. 8 through 13 inclusive, the slot walls of forming member 109 are provided with vertical grooves 153 whcih serve as a guide track for the lead wires as they are being bent downwardly. The friction between the lead wires and the groove surfaces is sufficient to cause the component to move downwardly with the forming member 109. In addition, each leg of the bifurcated portion 108 of ejecting member 105 is provided with horizontally disposed grooves 154 which serve to engage the component lead wires on their upper surfaces during the component ejecting operation.

Supported on frame 33 on the opposite side of the recess 35 from the above described component forming and ejecting device 39, and consequently on the opposite side of panel 11 from the component body portion, is the reciprocatable clinching member 41 which derives its movement from air motor 47. Clinching member 41 has a head portion 155 which is moved through its reciprocating cycle by piston 157 attached to air motor 47. Along the top surface of head 155 is mounted two clinching fingers 159 formed to provide surfaces which will cooperate with the extended portions of the leads of component 17 after the leads have been inserted through panel 11 to clinch them under the panel as shown in Fig. 13. Under certain circumstances, a reciprocating clinching device with clinching fingers may not be needed to mount electrical components on a panel. For instance, where a printed circuit is provided with apertures having a diameter smaller than or substantially equal to the diameter of the component leads, the electrical connection and component attachment to the panel may be made by wedging the leads into the printed circuit apertures. In this instance, a clinching operation will not be necessary, but a stationary or reciprocating die may be employed to support the circuit material during the inserting operation if desired.

Having in mind the foregoing description of the apparatus, it is believed that a complete understanding of the invention may now be had from a description of the operation. In order to prepare the apparatus for operation, and end portion of tape 67, which is free of components, is fed through guide track 37, past the work station, over tape guide roll 61 and upwardly onto tape receiving member or take-up roll 63, which has side plate 82 and knob 84 removed. Roll 63 may then be wound with tape until the first electrical component is in the assembly position. Replacement of plate 82 and knob 84 places the tape feed mechanism in condition for operation.

Figure 8:
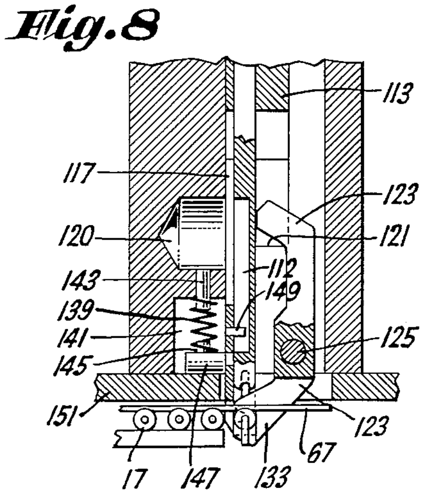
Figure 9:
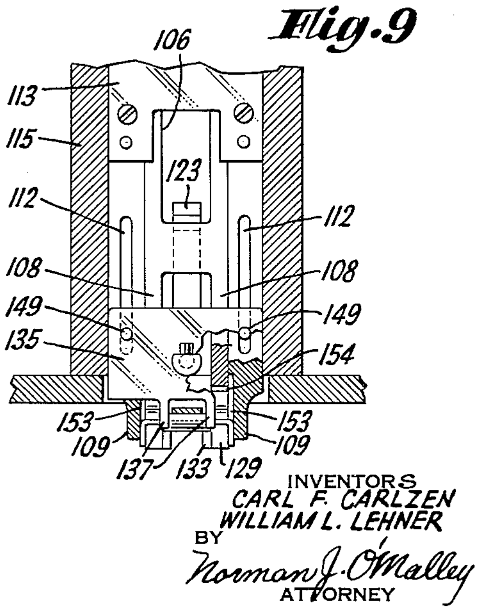

Assuming now that a suitable panel 11 has been moved into and stopped at the work station of machine 23 by conveyor 27, and that an electrical pulse from the master control circuit has been conveyed to control unit 55, the valve 51 will be energized to inaugurate movement of air motor 45. Referring to Figs. 6 and 7, the various components comprising the component handling device 39 are in their respective positions as shown, specifically noting that the ejecting member 105, forming member 109, and stop plate 135 all are in retracted positions. Holding arm 123 is in engagement with the electrical component 17 since cam surface 127 of the holding arm is contacting the cam surface 110 of ejecting member 105. As the downward movement of block 101 begins, the forming and the ejecting members start downwardly through the slot in housing 115 and under the influence of the block and pusher springs 111, and they continue until the axially disposed component leads are bent at substantially right angles to the longitudinal axis of the component as shown in Figs. 8 and 9. During this motion, stop plate 135 is allowed to move downwardly under the influence of spring 139 upon disengagement of pins 149 with the bottom of elongated recesses 112 to allow stop fingers 137 to proceed to its position intermediate the adjoining electrical components. As shown in Fig. 8, at this time, the bottom edges of the bi-furcated portion 108 of ejecting member 105 contacts the lower body portion of holding arm 123 to begin forcing this arm from its component engaging position.

Further downward movement of the ejecting and forming members causes the component to be extended to a position adjoining panel 11 so that the bent leads are in alignment with appropriate wire receiving portions or apertures in the panel. Holding arm 123 becomes disengaged from the component during this portion of the operation since the bottom of ejector 105 forces the arm to rotate counterclockwise and away from the assembly position. This rotation is possible since cam surface 110 of the ejecting member has moved below the position of the cam surface 127 on the holding member, the upper portion of which can thereby move into aperture 120 in housing 111. Forming member 109 has at this time reached its maximum extended position whereat the bottom of side plates 113 are abutting shelf 121. The respective positions of the machine elements at this time are shown in Figs. 10 and 11.

During the final portion of the lead forming and ejecting operation, downward movement is imparted to ejecting member 105 only. Grooves 154 formed in the lower surfaces of the ejecting member fingers act to engage the component leads and force them into the apertures in panel 11. Shortly after the leads have been inserted into the panel, an electrical control pulse causes the valve 53 to supply pressure to air motor 47 and thereby to move piston 157 upwardly. The clinching fingers 159 on head 155 acts on the ends of the leads to bend them underneath the lower surface of panel 11 as shown in Figs. 12 and 13.

After the inserting operation has been completed, a subsequent electrical pulse causes the pressure in valves 51 and 53 to reverse and return the operative machine elements again to the position shown in Figs. 6 and 7. During this retracting operation, spring 89 causes, and the slot in the linkage allows lever 81 to move upwardly, which in turn causes shaft 83 to operate on the tape receiving member or take-up roll 63. Movement of this roll pulls the next preceding tape carried electrical component into the assembly position. At this time, switch 103 is closed and the series circuit above described in the assembly line is completed so that transfer mechanism 27 can be started by the master timing mechanism to move the panels to their next position for subsequent operation.

Although one specific embodiment of the invention has been shown and described, it will be apparent to those skilled in the art that various changes and modifications may be made therein without departing from the scope of the invention as defined by the appended claims.

What is claimed is:

1. An apparatus having elements positioned at a workstation for operating on electrical components having a body portion with lead wires extending therefrom and for mounting the components upon a panel having lead wire receiving portions, said components being mounted on component transferring means and being fed on said said transferring means to the workstation from a supply position, the apparatus comprising component handling means located at the workstation for receiving and supporting the components; means for bending the component lead wires; means for removing said components from said component transferring means, moving said components adjacent said panel and the lead wires into engagement with the panel lead wire receiving portions; and means for moving said component transferring means to feed said components to said component handling means.

2. An apparatus having elements positioned at a workstation for operating on electrical components having a body portion with lead wires extending therefrom and for mounting the components upon a panel having lead wire receiving portions, said components being mounted by said body portion on pliable adhesive coated strip material and being fed on said pliable strip to the workstation from a supply position, the apparatus comprising component handling means located at the workstation for receiving and supporting the components; means for bending the component lead wires; means for removing said components from said pliable strip, moving said components adjacent said panel and the lead wires into engagement with the panel lead wire receiving portions; and means for moving said pliable strip to feed said components to said component handling means.

3. An apparatus having elements positioned at a work station for operating on electrical components each having a body portion with lead wires extending therefrom and for mounting the components upon a panel having lead wire receiving portions, said components being fed on a component transfer means to the work station from a supply position, the apparatus comprising means for supporting the components at the work station, forming means located at the work station for bending the component lead wires, component ejecting means located at the work station for moving said components from said component transfer means to a position adjacent said panel and the lead wires into engagement with the panel lead wire receiving portions, power means providing the movement for said forming and ejecting means, and a device for feeding said component transfer means from the supply position through the work station.

4. An apparatus having elements positioned at a work station for operating on electrical components each having a body portion with lead wires extending therefrom and for mounting the components upon a panel having lead wire receiving portions, said components being fed on a tape to the work station from a supply position, the apparatus comprising means for supporting the components at the work station, forming means located at the work station for bending the component lead wires, component ejecting means located at the work station for moving said components from said tape to a position adjacent said panel and the lead wires into engagement with the panel lead wire receiving portions, power means providing the movement for said forming and ejecting means, and a device for feeding said tape from the supply position through the work station, said device including a tape receiving member, and actuating means operable on said receiving member to provide travel of the tape to effect movement of said components into the work station.

5. In combination with an apparatus having elements positioned at a work station for successively mounting the leading one of a plurality of tape mounted serially arrayed electrical components upon a panel, a device for feeding the tape through the work station to bring the components to the work station in succession, means for guiding the travel of said tape, a tape receiving member, and a tape movement actuating member formed to provide movement of the leading one of said tape carried components into the work station after each succeeding component mounting operation, said actuating member comprising a clutch for maintaining tension on said tape and for allowing tape movement in the component feed direction, and a lever formed to transmit the actuating movement through a distance varying in accordance with the distance of the leading component from the work station.

References Cited in the file of this patent

UNITED STATES PATENTS

| | | |
|---|---|---|
| 750,605 | Cohen | Jan. 26, 1904 |
| 1,255,640 | Ritscher | Feb. 5, 1918 |
| 2,014,726 | Flood | Sept. 17, 1935 |
| 2,023,045 | Flood | Dec. 3, 1935 |
| 2,530,312 | Nasmith | Nov. 14, 1950 |
| 2,738,093 | Derby | Mar. 13, 1956 |
| 2,748,388 | Cardani | June 5, 1956 |
| 2,772,416 | Dorosz | Dec. 4, 1956 |